United States Patent [19]

Brende et al.

[11] 4,439,699
[45] Mar. 27, 1984

[54] LINEAR MOVING COIL ACTUATOR

[75] Inventors: Arthur P. Brende, Byron; Richard W. Luoma, Chatfield, both of Minn.

[73] Assignee: International Business Machines Corporation, Armonk, N.Y.

[21] Appl. No.: 340,169

[22] Filed: Jan. 18, 1982

[51] Int. Cl.³ .......................................... H02K 41/02
[52] U.S. Cl. ....................................... 310/13; 310/27
[58] Field of Search .................................. 310/13, 27

[56] References Cited

U.S. PATENT DOCUMENTS

| | | | |
|---|---|---|---|
| 3,161,793 | 12/1964 | Laithwaite | 310/27 |
| 3,417,268 | 12/1968 | Lace | 310/27 |
| 3,656,015 | 4/1972 | Gillum | 310/13 |
| 3,723,780 | 3/1973 | Gillum | 310/13 |
| 3,889,139 | 6/1975 | Hughes | 310/13 |
| 3,896,319 | 7/1975 | Chari | 310/27 X |

Primary Examiner—Donovan F. Duggan
Attorney, Agent, or Firm—Robert W. Lahtinen

[57] ABSTRACT

The magnetic head actuator includes a substantially totally enclosed self-shielding voice coil linear motor which includes a continuous, cylindrical permanent magnet of flexible material which is sealed against the inner cylindrical wall of the outer core by a flared copper sleeve that also serves as a non-magnetic, conductive shorted turn to reduce instantaneous inductance of the drive coil. An annular reluctance gap in the outer core provides symmetrical distribution of the permanent magnet flux.

3 Claims, 3 Drawing Figures

LINEAR MOVING COIL ACTUATOR

BACKGROUND OF THE INVENTION

This invention relates to rotating data recording devices and more particularly to a self-shielding linear motor actuator for moving transducing heads from one data track to another.

A linear motor for driving magnetic heads from one track position to another of a rotating data storage device must have low mass, high efficiency and good dynamic response. Additionally, it is desirable that such a device be simple, reliable and inexpensive to produce. Voice coil type motors have been widely used for this purpose since such devices meet the stated requirements. Such units employ strong permanent magnets and excitation of the coil produces strong AC flux fields which are inherently incompatible with the magnetic data storage function involving minute magnetic data storage domains on the media which enable the read/write heads to generate currents in the micro ampere range.

As data densities increase with a reduction in the size of the magnetic domains and the magnitude of the generated signal, it becomes increasingly more important that the device be not only more accurate and precise in operation, but also that stray flux fields and the presence of magnetic particulate matter be eliminated. The problem and conditions are further aggravated by the desire to reduce device size and thereby place the component parts in even closer proximity.

SUMMARY OF THE INVENTION

In the linear actuator motor of the present invention a substantially totally enclosed and wholly shielded device is provided by a closed end cylindrical outer core and a two-piece inner core that encloses the outer core open end and creates a pair of axially extending inner core slots. The permanent magnet is a continuous cylindrical magnet, radially polarized and formed of two concentric layers of flexible magnet material with the peripherally abutting end locations non-aligned to assure continuity. The permanent magnet has end seals positioned at each axial end. A copper tube element is expanded concentrically within the permanent magnet and end seals with the tube ends flared to mechanically support and seal the magnet against the inner cylindrical surface of the outer core. The copper tube element also serves as a conductive, non-magnetic shorted turn to reduce the instantaneous inductance of the drive coil. With both ends of the enclosure available as flux return paths, a reluctance gap is formed in the outer core to provide a symmetrical distribution of the permanent magnet flux and is configured to prevent the escape of stray flux.

DETAILED DESCRIPTION

Figure 1:
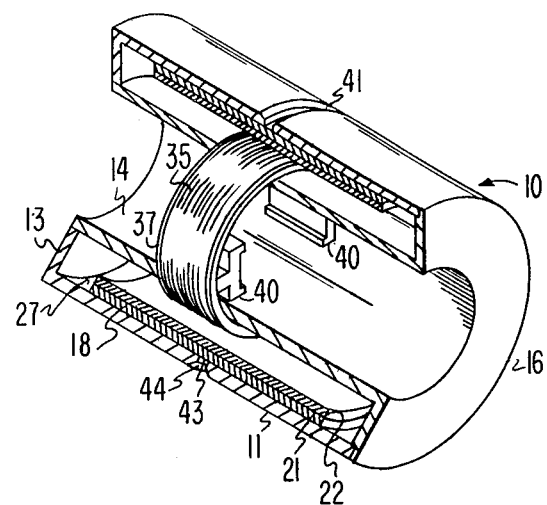
FIG. 1 is a schematic showing partially broken away of the linear motor of the invention.
Figure 2:
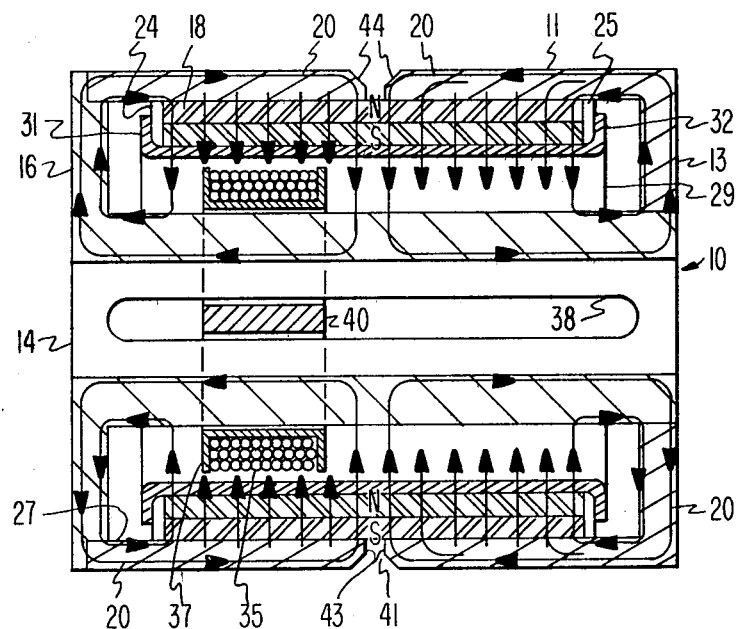
FIG. 2 is an axial section of the voice coil linear motor of FIG. 1, taken 90 degrees from the inner core slots, showing the core, voice coil, coil form, permanent magnet and permanent magnet retaining parts.

FIGS. 1 and 2 illustrate a schematic embodiment of the elements of the linear motor 10. The outer core 11 includes an axial end wall portion 13 and the inner core 14 includes a wall portion 16 at the opposite axial end. Cores 11 and 14 are formed of magnetically permeable iron and fit closely together to form an annular enclosure about permanent magnet 18 and a flux return path as indicated by the lines 20. The magnet 18 is formed of flexible magnetic material as a continuous, cylindrical magnet element that is radially polarized. Two layers 21 and 22 form magnet 18. Each of the layers 21 and 22 is formed of a rectangular piece of flexible magnet material with the abutting edges of the layers non-aligned to assure the continuous cylindrical magnetic structure. Sealing rings 24, 25 of elastomeric material are disposed at the axial ends of cylindrical permanent magnet 18. Magnet 18 and seal rings 24, 25 are compressively retained against the outer core cylindrical inner wall 27 by a retainer 29. Retainer 29 is a tubular copper element that is positioned concentrically within magnet 18 and thereafter radially expanded to compressively retain the magnet against core wall 27 and subsequently the ends 31, 32 are flared to maintain the magnet 18 and end seals 31, 32 captive as a unit. Retainer 29 being a non-magnetic, conductive copper element also serves as a shorted turn to reduce the instantaneous inductance of drive coil 35.

The drive coil 35 is wound on a coil form 37 with the coil and form assembly being disposed in and axially movable in the air gap defined between the retaining element 29 and the inner core 14. Drive coil 35 may be a conventionally wound single wire or alternatively bifilar wire wound on the plastic former 37. The drive coil is completely enclosed by the outer core and inner core assembly with with exception of a pair of slotted openings 38 through which extend webs 40 to attach the movable drive coil assembly to a transducer head carriage (not shown).

With both axial ends closed between the inner and outer cylindrical cores by magnetically permeable material, dual flux return paths exist with flux distributed evenly around each end to provide more even flux gap distribution, to avoid saturation effects on the force constant and to permit reduced size. To assure symmetry of the permanent magnet flux distribution, an annular reluctance gap 41 is formed in the outer core 11 and located at the approximate axial mid point. The gap is defined by radial surfaces 43 and diverging surfaces 44 with the gap width between the radial surfaces being less than the thickness of cylindrical wall of the core 11 to prevent the flux field from emitting stray flux. The gap 41 is peripherally discontinuous to prevent the partitioning of the outer core into two axially separated parts.

Figure 3:
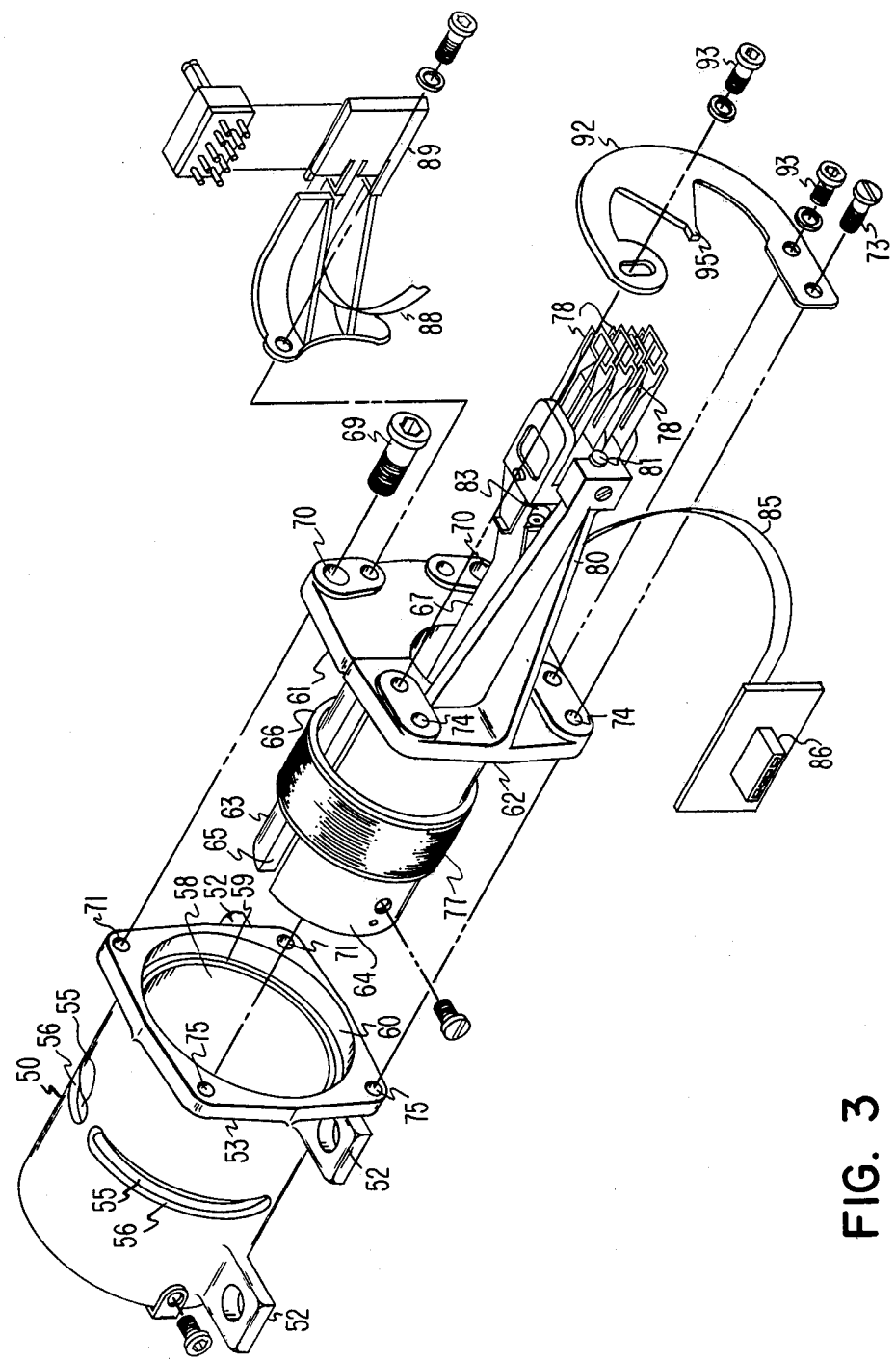
FIG. 3 is a partial exploded view of an actuator incorporating the structure of the invention including linear motor and head carriage portions.

FIG. 3 is a second embodiment employing structure similar to FIGS. 1 and 2 and showing the inter relationship with allied structure. The outer core 50 is formed as a cast steel element with projecting mounting lugs 52, an attachment flange 53 at one axial end and a continuous wall at the opposite axial end which is obscured. The peripheral, discontinuous reluctance gap 54 has radial surfaces 55 and inclined surfaces 56. The expanded copper tube retainer element 58 and elastomer sealing ring 59 hold the permanent magnet which is not visible against the outer core inner cylindrical wall surface 60.

The inner core is formed of two magnetically permeable steel parts 61, 62. Parts 61 and 62 cooperate to provide an axial end wall closure for the annular space in which the permanent magnet, air gap and drive coil are positioned. Parts 61 and 62 respectively have cantilevered projections 63 and 64 which in the assembled condition abut the axial end wall of outer core 50 to provide the flux return path at the axial end remote from the flange 53 and provide only a partially cylindrical inner core wall thereby defining the longitudinally extending slots between surfaces 65 through which the coil form 66 is attached to carriage 67. Part 61 is secured to outer core 50 by cap screws 69 which extend through openings 70 and are received in threaded bores 71 in flange 53. In like manner part 62 is secured to outer core 50 by cap screws 73 that extend through openings 74 and are received in the threaded bores 75.

Carriage 67 is connected at one end to coil form 66 which carries the drive coil 77 and at the other end supports four cantilevered transducer head mounting flexure elements 78. Core part 62 also includes a cantilevered arm 80 which supports a rod 81 that extends parallel to the axis of the inner and outer cores and the drive coil. Rod 81 serves as a way along which the carriage moves linearly in response to forces imparted by the drive coil 77. Carriage 67 carries four rollers 83 (one of which is visible) arranged in longitudinally spaced canted pairs which in cooperation with a third roller pair including one bearing which is spring biased against a way formed in part 61 cause linear movement parallel to the axis of rod 81 in response to forces imparted by the drive coil.

The drive coil 77 is electrically connected to control circuitry by a flexible flat cable 85 which extends from a stationary socket 86 to the drive coil terminations on carriage 67. The transducers carried by the flexure element to 78 are electrically connected to the exterior by a flexible flat cable 88 that extends from socket 89 to the transducer conductor terminations mounted on carriage 67. Socket 89 is carried by bracket 90 which is secured to inner core part 61 by cap screws 91. Also secured to part 62 is a crash stop spring 92 which is retained by cap screws 93 and one of the screws 73. This spring is a resilient dual cantilevered element including a projecting tang 95 that is engaged by the carriage 67 to limit travel of the carriage assembly toward the linear motor.

While the invention has been shown and described with reference to preferred embodiments, it will be understood that various changes in form and details may be made therein without departing from the spirit and scope of the invention.

Having thus described my invention, what is claimed as new and desired to be secured by Letters Patent is:

1. A linear actuator for positioning the transducer carriage assembly in a disk file comprising:
   a cylindrical outer core element of magnetically permeable material;
   a cylindrical inner core element of magnetically permeable material, coaxial and concentrically mounted within said outer core element;
   at least one axially extending slotted opening in said inner core element;
   end closure means of magnetically permeable material associated with said core elements, whereby said core elements and said end closure means form a substantially totally enclosed annular space;
   a continuous cylindrical permanent magnet within said annular space adjacent said outer core element inner wall in concentric relation therewith;
   a tubular retaining element of non magnetic conductive material concentrically within said permanent magnet which provides a shorted turn and retains said magnet against said outer core;
   annular sealing elements at each axial end of said permanent magnet with said retaining element being flared at each end to cooperate with said annular sealing elements to seal said permanent magnet from said annular space;
   a carriage supported for linear motion in the direction of the axis of said core elements with a portion thereof extending within said inner core element;
   a drive coil substantially coaxial with said core elements and disposed in said annular space between said inner core element and said tubular retaining element; and
   connecting means extending through said at least one slotted opening and interconnecting said drive coil and said carriage for unitary linear motion.

2. The linear actuator of claim 1 wherein said copper tube is radially expanded to compressively retain said continuous permanent magnet and said annular sealing elements against the inner cylindrical wall of said outer core element.

3. A linear actuator for positioning the transducer carriage assembly in a disk file comprising:
   a cylindrical outer core element of magnetically permeable material;
   a cylindrical inner core element of magnetically permeable material, coaxial and concentrically mounted within said outer core element;
   at least one axially extending slotted opening in said inner core element;
   end closure means of magnetically permeable material associated with said core elements, whereby said core elements and said end closure means form a substantially totally enclosed annular space;
   a continuous cylindrical permanent magnet within said annular space adjacent said outer core element inner wall in concentric relation therewith;
   said continuous cylindrical permanent magnet comprising two sheets of flexible permanent magnet material, each cylindrically formed, concentrically positioned with respect to the other and radially magnetized with the abutting edges radially non-aligned;
   a tubular retaining element concentrically within said permanent magnet which retains said magnet against said outer core;
   a carriage supported for linear motion in the direction of the axis of said core elements with a portion thereof extending within said inner core element;
   a drive coil substantially coaxial with said core elements and disposed in said annular space between said inner core element and said tubular retaining element; and
   connecting means extending through said at least one slotted opening and interconnecting said drive coil and said carriage for unitary linear motion.

* * * * *